United States Patent
Huang et al.

(10) Patent No.: US 7,446,702 B2
(45) Date of Patent: Nov. 4, 2008

(54) POSITION DATA EXCHANGE SYSTEMS, MOBILE COMMUNICATION DEVICES, AND METHODS

(75) Inventors: Cheng-Wen Huang, Taipei County (TW); Chuan-Yi Chang, Taipei County (TW); Hung-Chih Yu, Taipei County (TW)

(73) Assignees: Giga-Byte Communications Inc., Taipei County (TW); Giga-Byte Technology Co., Ltd., Taipei Hsien (TW)

( * ) Notice: Subject to any disclaimer, the term of this patent is extended or adjusted under 35 U.S.C. 154(b) by 154 days.

(21) Appl. No.: 11/318,570

(22) Filed: Dec. 28, 2005

(65) Prior Publication Data

US 2007/0146199 A1    Jun. 28, 2007

(51) Int. Cl.
*G01S 1/00* (2006.01)
*G01S 5/14* (2006.01)

(52) U.S. Cl. .................... 342/357.09; 342/357.01; 342/357.017

(58) Field of Classification Search ................ 342/357.01–357.17
See application file for complete search history.

(56) References Cited

U.S. PATENT DOCUMENTS

| | | | |
|---|---|---|---|
| 5,742,509 A * | 4/1998 | Goldberg et al. | 701/211 |
| 6,362,778 B2 * | 3/2002 | Neher | 342/357.07 |
| 6,480,147 B2 * | 11/2002 | Durst et al. | 342/357.07 |
| 6,826,473 B1 * | 11/2004 | Burch et al. | 701/207 |
| 7,143,130 B2 * | 11/2006 | Lin | 709/203 |
| 7,203,502 B2 * | 4/2007 | Wilson et al. | 455/456.2 |
| 2002/0050945 A1 * | 5/2002 | Tsukishima et al. | 342/357.12 |
| 2003/0033083 A1 * | 2/2003 | Nakashima et al. | 701/211 |
| 2003/0052815 A1 * | 3/2003 | Russell et al. | 342/357.1 |
| 2004/0012518 A1 * | 1/2004 | Mohan | 342/357.1 |
| 2004/0066329 A1 * | 4/2004 | Zeitfuss et al. | 342/357.07 |
| 2004/0158401 A1 * | 8/2004 | Yoon | 701/209 |
| 2004/0203909 A1 * | 10/2004 | Koster | 455/456.1 |

* cited by examiner

*Primary Examiner*—Thomas H. Tarcza
*Assistant Examiner*—Harry Liu
(74) *Attorney, Agent, or Firm*—Birch, Stewart, Kolasch & Birch, LLP

(57) ABSTRACT

A position data exchange system comprises first and second mobile communication devices. The first communication device retrieves current coordinates of itself from a Global Positioning System (GPS) receiver and transmits the coordinates through a wireless communication channel from which the second communication device receives the coordinates. The second communication device displays data concerning the current location of the first communication device according to the coordinates and further provides navigation.

12 Claims, 6 Drawing Sheets

POSITION DATA EXCHANGE SYSTEMS, MOBILE COMMUNICATION DEVICES, AND METHODS

BACKGROUND

The invention relates to computer communication techniques, and in particular, to position data exchange systems, mobile communication devices, and methods.

A cell phone can receive signals from global positioning system (GPS) satellites utilizing a built-in or an external portable GPS receiver. GPS systems are typically used for navigation or positioning. Notification of cell phone positions, however, is still achieved by human communication.

SUMMARY

Accordingly, position data exchange systems, mobile communication devices, and methods are provided.

An exemplary embodiment of a position data exchange system comprises a first mobile communication device and a second mobile communication device. The first mobile communication device comprises a global positioning system (GPS) receiver deriving coordinates of the first mobile communication device and a communication unit transmitting the coordinates. The second mobile communication device receives the coordinates and displays corresponding information of the coordinates of the first mobile communication device.

An exemplary embodiment of a mobile communication device comprises a storage device, a communication unit, and a processor. The storage device stores an electronic map. The communication unit initiates a wireless communication channel. The processor coupled to a global positioning system (GPS) receiver retrieves current coordinates of the mobile communication device from the GPS receiver. The processor extracts map image data corresponding to the coordinates from the electronic map and transmits the map image data through the wireless communication channel.

An exemplary embodiment of a position data exchange method is implemented in a mobile communication device. Coordinates of the first mobile communication device are retrieved from a global positioning system (GPS) receiver. The coordinates are transmitted to a second mobile communication device through a wireless communication channel.

DESCRIPTION OF THE DRAWINGS

The invention can be more fully understood by reading the subsequent detailed description and examples with references made to the accompanying drawings, wherein.

DETAILED DESCRIPTION

Position data exchange systems, mobile communication devices, and methods are provided. Note that entities, steps, and configuration thereof described in the following are only examples and can be adjusted according to real requirements.

Figure 1:
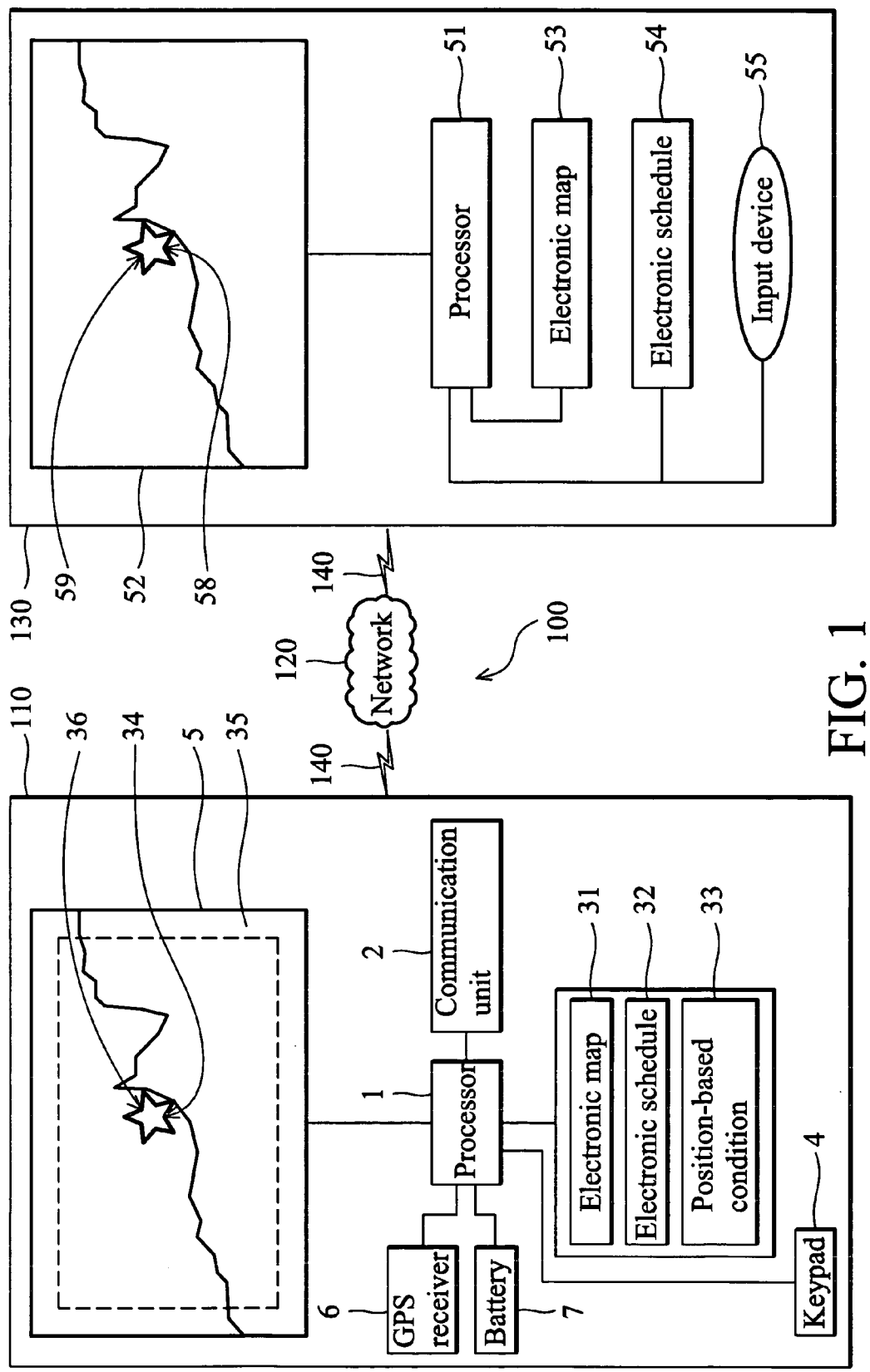
FIG. 1 is a block diagram of an exemplary embodiment of a position data exchange system.

Position data exchange system 100 in FIG. 1 comprises first mobile communication device 110, second mobile communication devices 130, and network 120. Network 120 may be a network provided by a telecommunication service provider, a local area network (LAN), or the Internet. Mobile communication devices 110 and 130 initiate wireless communication channel 140 through network 120. They may directly initiate wireless communication channel 140 without utilizing network 120. For example, wireless communication channel 120 may conform to wireless LAN, Bluetooth, global system for mobile communications (GSM), general packet radio service (GPRS), wideband code division multiple access (WCDMA), CDMA2000, or Wi-Fi specifications respectively.

Mobile communication devices 110 and 130 are illustrated as cell phones, but may alternatively comprise personal digital assistants (PDA), laptops, or other handheld devices.

First mobile communication device 110 comprises a global positioning system (GPS) receiver 6 which determines the latitude and longitude thereof by calculating the time difference for signals from different satellites. GPS receiver 6 may be built into device 110. Mobile communication device 110, however, may externally connect to a GPS receiver or may not utilize any GPS receiver. Components of first mobile communication device 110 comprise processor 1, communication unit 2, storage device 3, keypad 4, display 5, GPS receiver 6, and battery 7. Processor 1 is coupled to the other components.

Second mobile communication device 130 comprises processor 51, display 52, electronic map 53, electronic schedule 54, and input device 55.

Communication unit 2 initiates wireless communication channel 140. System 100 implements a position data exchange method, wherein position data transmission may be triggered based on time or location factors (such as subsequently described electronic schedule 54 and position-based condition 33), or user operations, detailed description of which is provided in the following.

Figure 2:
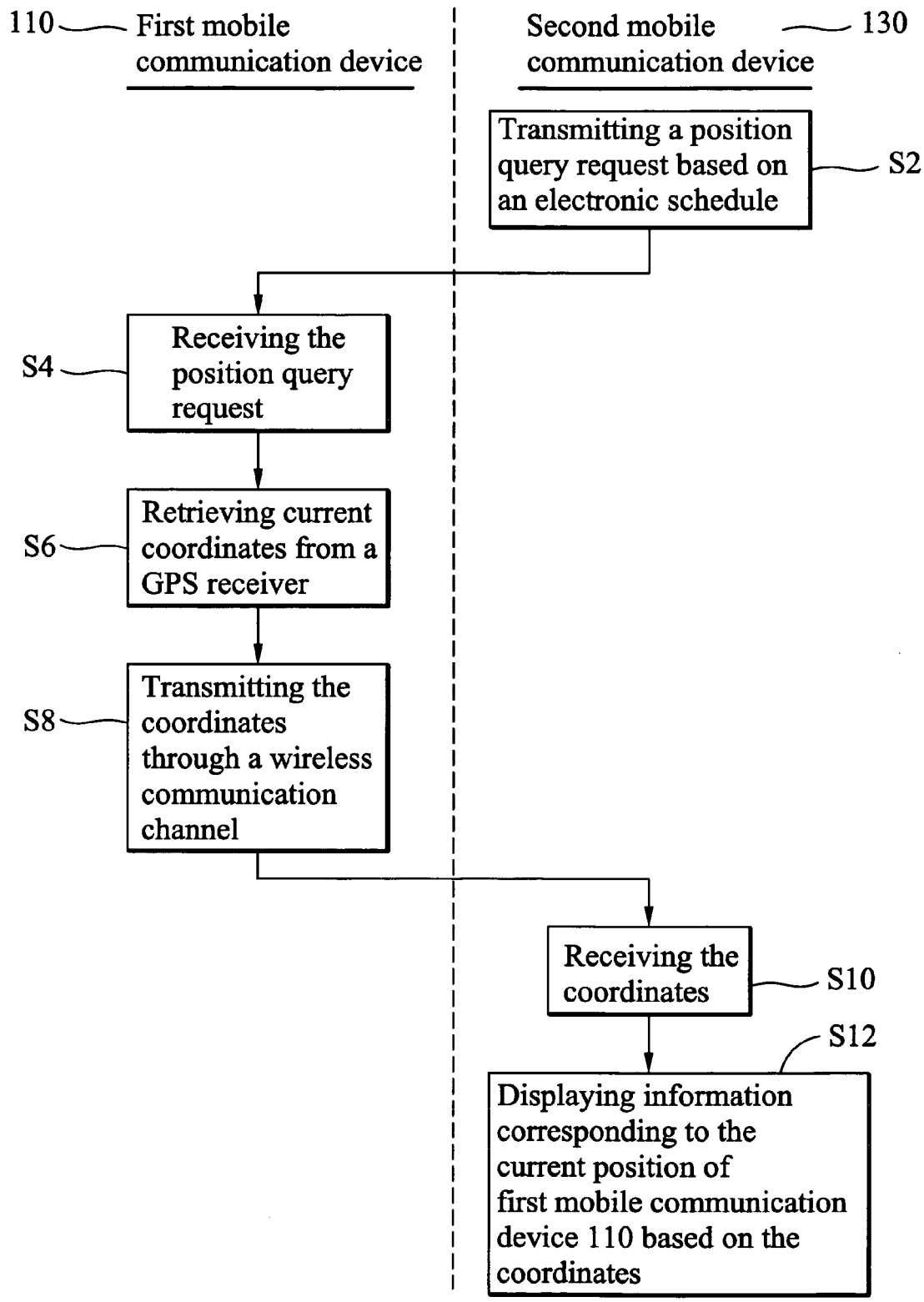
FIG. 2 is a flowchart of an exemplary embodiment of a position data exchange method.

In second mobile communication device 130 of FIG. 2, processor 51 transmits a position query request based on electronic schedule 54 to inquire current location of first mobile communication device 110 (step S2). For example, electronic schedule 54 stores cycles (such as one day, one, week, or one month) or a certain time to transmit position query requests. Processor 51 determines if the certain time has arrived. If so, processor 51 delivers a position query request. Processor 51 may deliver a position query request in response to manual operations on second mobile communication device 130.

First mobile communication device 110 receives the position query request (step S4) and may automatically perform the following steps in response. The following steps may be triggered by operations on keypad 4 or other input devices.

Processor 1 retrieves current coordinates (latitude and longitude) of first mobile communication device 110 from GPS receiver 6 (step S6) and transmits the coordinates through the wireless communication channel 140 (step S8).

Second mobile communication device 130 receives the coordinates (step S10) and displays information corresponding to the current position of first mobile communication device 110 based on the coordinates (step S12).

For example, as shown in FIG. 1, second mobile communication device 130 determines the coordinates corresponds to a position 58 on electronic map 53 and displays a symbol 59 representing first mobile communication device 110 on position 58. If comprising the identification (such as a phone number or user name) of first mobile communication device 110, second mobile communication device 130 may display it on the symbol 59.

The coordinates may be transferred in form of short messaging services (SMS), enhanced messaging services (EMS), and multimedia messaging services (MMS) messages.

Note that first mobile communication device 110 may actively perform steps S6~S8, as described in the following.

Figure 3:
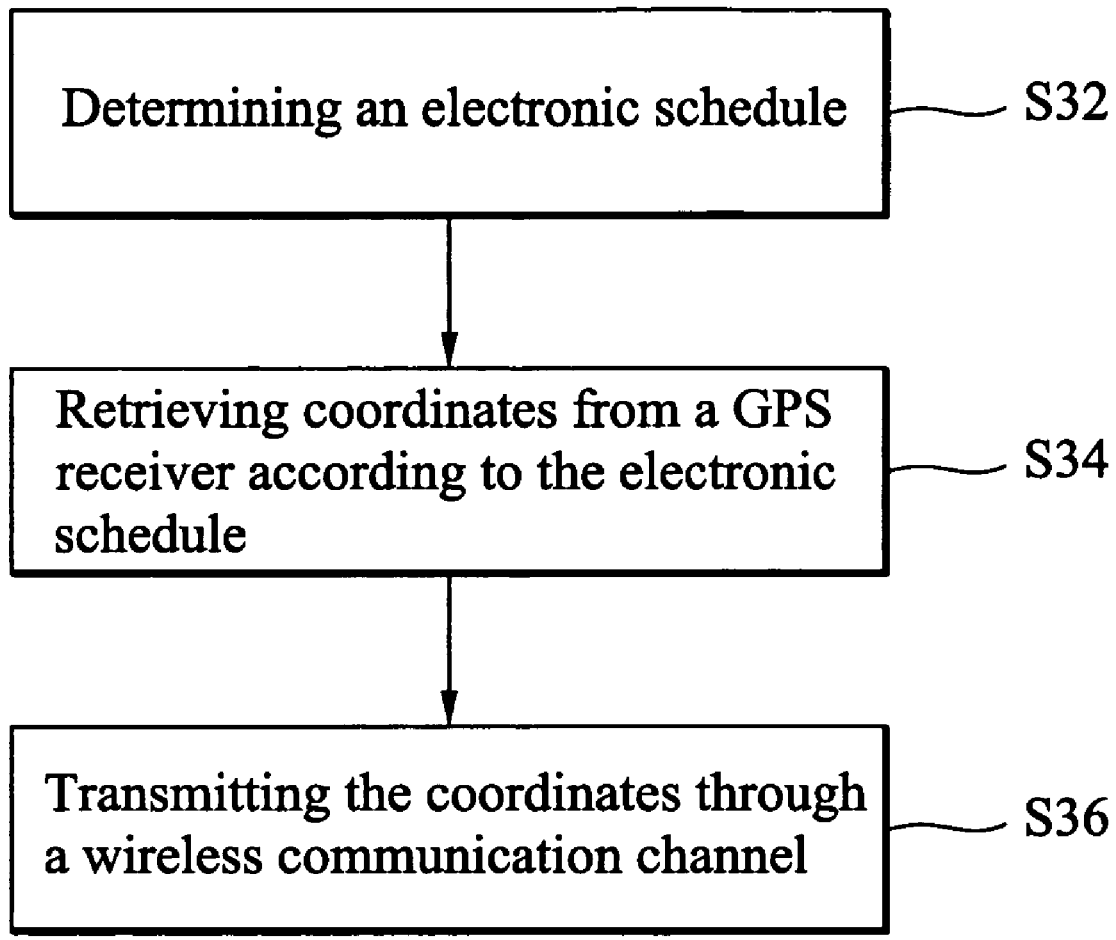
FIG. 3 is a flowchart of position data transmission based on a predetermined schedule.

With reference to FIGS. 1 and 3, first mobile communication device 110 comprises electronic schedule 32 stored in storage device 3. For example, electronic schedule 32 stores cycles (such as one day, one, week, or one month) or a certain time to transmit current coordinates of first mobile communication device 110. Processor 1 determines the certain time stored in electronic schedule 32 (step S32), accordingly retrieves coordinates from GPS receiver 6 (step S34) and transmits the coordinates through wireless communication channel 140 (step S36). Processor 1 may transmit coordinates when triggered by operations of keypad 4 or other input devices.

Figure 4:
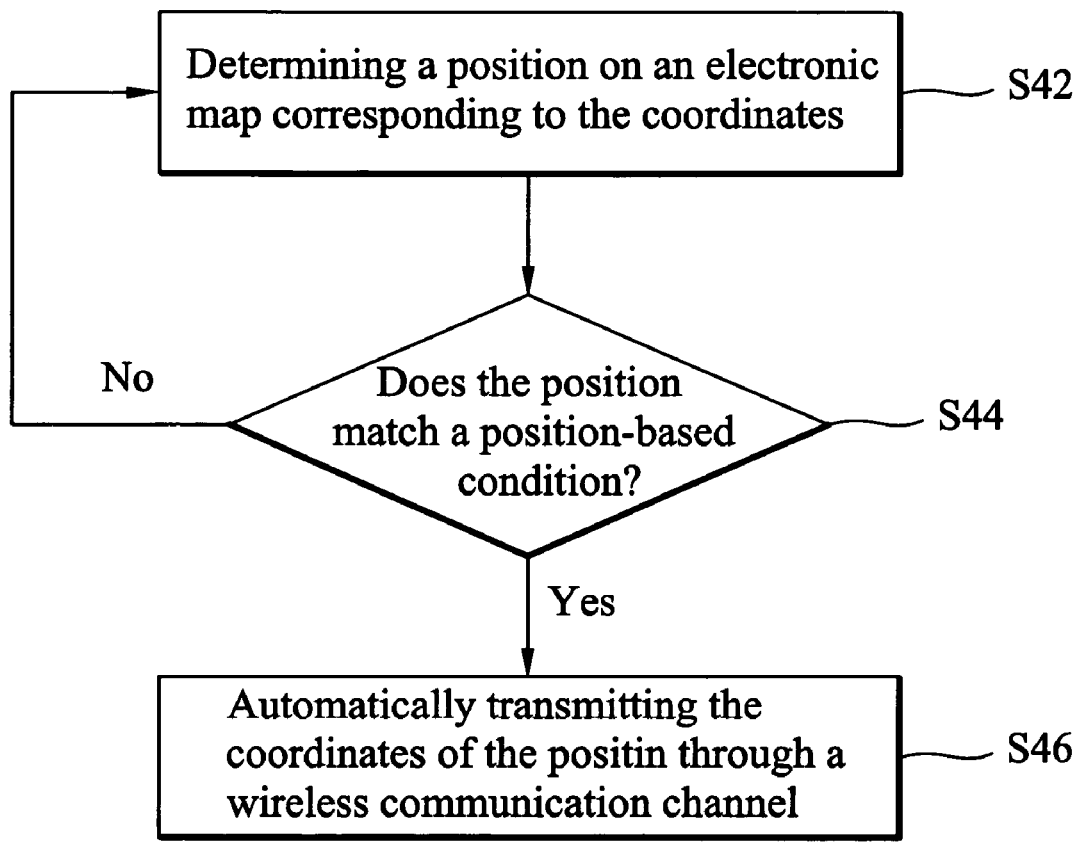
FIG. 4 is a flowchart of position data transmission according to a position-based condition.

For example, with reference to FIGS. 1 and 4, first mobile communication device 110 comprises electronic map 31 and position-based condition 33 stored in storage device 3. Position-based condition 33 forms a criterion for positioning, such as a range around a specific place (such as a school or a household). When retrieving current coordinates of first mobile communication device 110 from GPS receiver 6, processor 1 determines a position 34 on electronic map 31 corresponding to the coordinates (step S42) and determines if the position 34 matches position-based condition 33 (step S44). If so, processor 1 automatically transmits the coordinates through wireless communication channel 140 (step S46). If not, step S42 is repeated.

For example, position-based condition 33 comprises a range within a predetermined distance from a place. When the distance between the place and the current coordinates of first mobile communication device 110 is less than the predetermined distance, processor 1 determines that the position-based condition 33 is satisfied.

Note that first mobile communication device 110 may in advance stores phone number of second mobile communication device 130 as destination for execution of steps S36 and S46.

Figure 5:
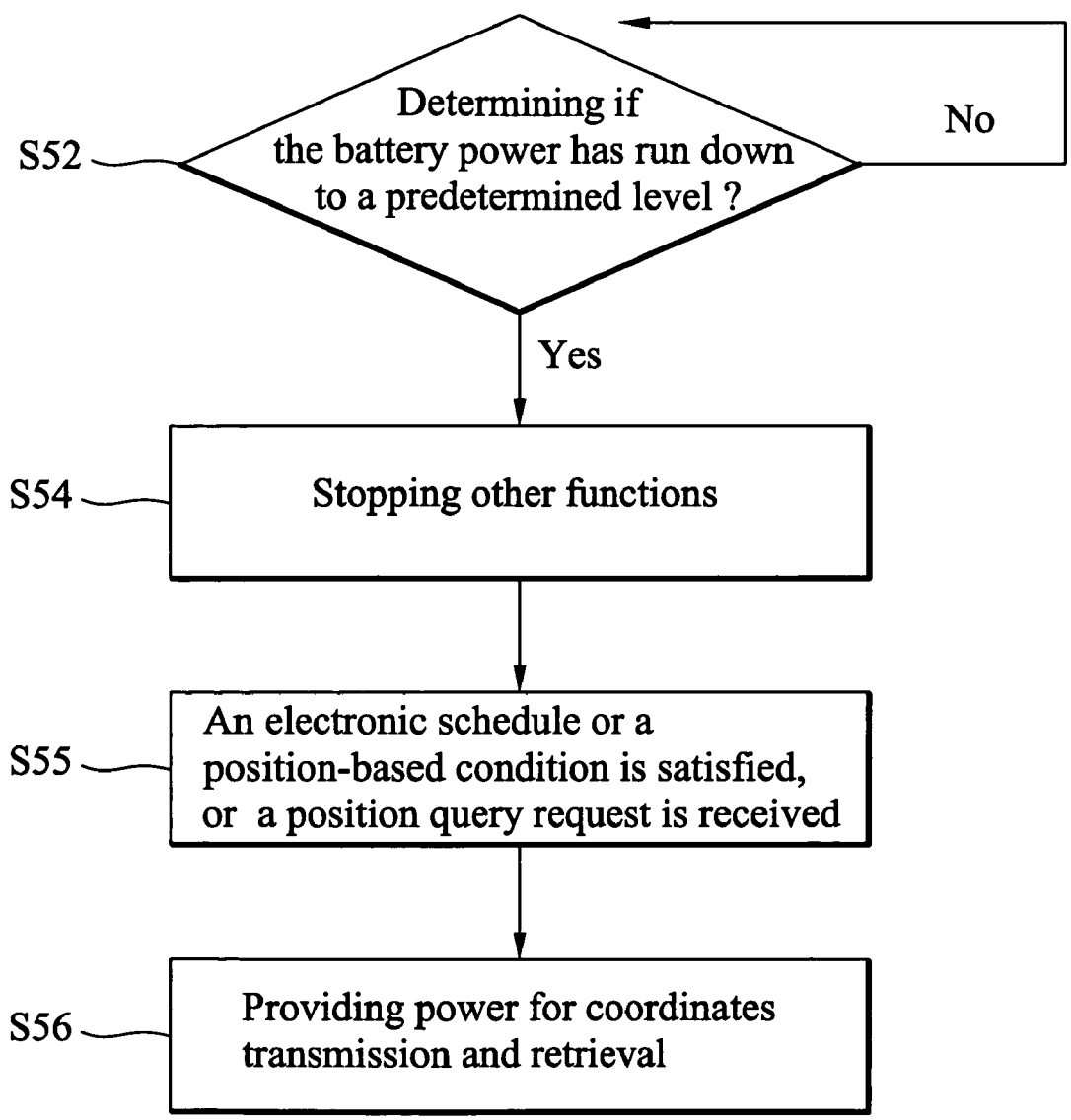
FIG. 5 is a flowchart of power management of a mobile communication device.

Additionally, to ensure that the described functions still operate in emergency situations, with reference to FIG. 5, processor 1 may determine if the power of battery 7 has run down to a predetermined level (step S52). If so, first mobile communication device 110 stops all functions except for the functions related to receiving position query requests and responding thereto by transmitting the coordinates (step S54). First mobile communication device 110 then determines if an electronic schedule or position-based condition is matched or if a position query request is received (step S55). If so, current coordinates are transmitted to a predetermined destination (such as second mobile communication device 130) (step S56). For example, in step S54, first mobile communication device 110 may shut down display 5 and keypad 4.

Second mobile communication device 130 may lack an electronic map or is unable to identify received coordinates, thus, first mobile communication device 110 may perform the following steps automatically or passively in response to a position query request.

Figure 6:
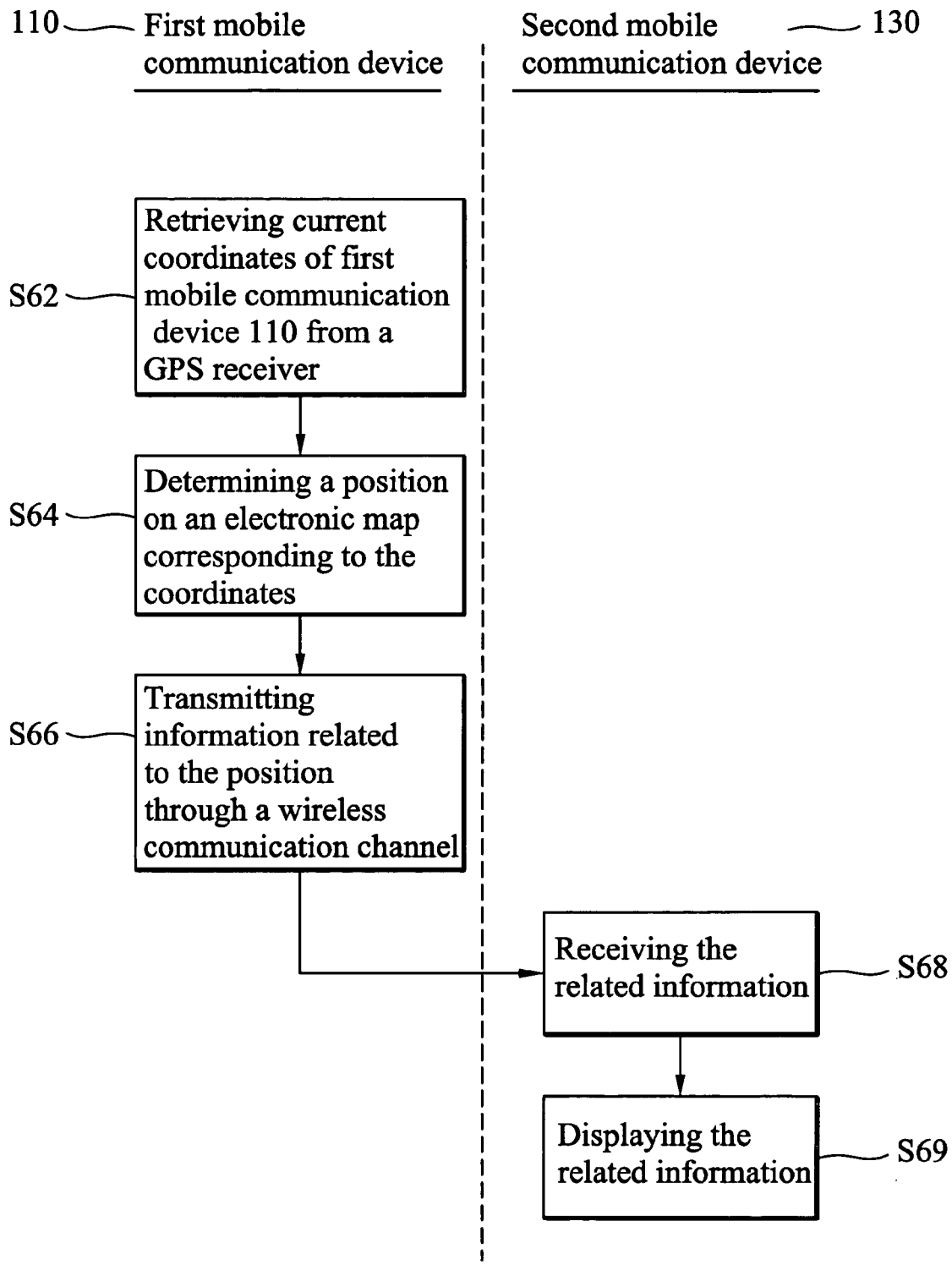
FIG. 6 is a flowchart of another exemplary embodiment of a position data exchange method.

With reference to FIG. 6, processor 1 retrieves current coordinates of first mobile communication device 110 from GPS receiver 6 (step S62), determines a position 34 on electronic map 31 corresponding to the coordinates (step S64), and transmits information related to position 34 to second mobile communication device 130 through wireless communication channel 140 (step S66). Second mobile communication device 130 receives and displays the related information (steps S68 and S69).

Processor 1 extracts image data of area 35 (shown in FIG. 1) comprising position 34 from electronic map 31. The extracted map image data may conform to various image formats, such as .jpg or .gif files or animated images (such as an image with a jumping arrow pointing). The map image data may comprise a single map image or multiple map images of different scales to facilitate browsing at the recipient. An extracted map image comprises symbol 36 (shown in FIG. 1) indicating the current position of first mobile communication device 110. The related information may be transmitted in the form of a simplified message. Second mobile communication device 130 receives and displays map images on display 52. Additionally, the related information may comprise text data related to position 34 extracted by processor 1. Second mobile communication device 130 receives and displays the text data on display 52.

When communication unit receives a position query request from wireless communication channel 140, processor 1 may automatically transmit the related information in response. Otherwise, as described previously, processor 1 may perform steps S62~66 based on electronic schedule 32, position-based condition 33, or both.

In summary, position data transmitted from first mobile communication device 110 to second mobile communication device 130 may comprise coordinates, text, images, animated images, or combination thereof. Second mobile communication device 130 receives and displays position data of first mobile communication device 110. If provided with navigation functions (requiring an electronic map and GPS functions), second mobile communication device 130 may provide a path to first mobile communication device 110.

When the power of battery 7 has run down to a predetermined level, processor 1 stops all functions except for those related to receiving position query requests and responding thereto by transmitting the coordinates, and the remaining power of battery 7 only supports execution of steps S62~S66.

Thus, battery 7 reserves a portion of power for active or passive position data (such as coordinates or related information) transmission. First mobile communication device 110 notifies another communication device of the current position thereof without utilizing human communication.

Two communication devices are illustrated in the description, a mobile communication device, however, may simultaneously issue coordinates to or receive position data from multiple receiving devices. When receiving a plurality of coordinates from multiple devices, a communication device may differentiate these devices by different colors, symbols, or identification codes (such as phone numbers or usernames).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A position data exchange system, comprising:
 a first cell phone, comprising:
  a global positioning system (GPS) receiver deriving coordinates of the first cell phone;

an electronic map and a first electronic schedule, each of which is stored in the first cell phone, the first electronic schedule scheduling when to transmit the coordinates;

a communication unit transmitting the coordinates; and a second cell phone receiving the coordinates transmitted from the first cell phone, and displaying corresponding information of the coordinates of the first cell phone; wherein:

the second cell phone comprises a second electronic schedule scheduling when to transmit a request to the first cell phone; and the first cell phone transmitting the coordinates to the second cell phone when receiving the request from the second cell phone, or when a current position of the first cell phone satisfies a position-based condition, or when the first electronic schedule is due; and wherein the first cell phone extracts a map image corresponding to the coordinates from the electronic map, and transmits the map image to the second cell phone.

2. The system as claimed in claim 1, wherein the second cell phone comprises an electronic map and is capable of displaying a symbol representing the first cell phone at a position on the electronic map corresponding to the coordinates.

3. The system as claimed in claim 1, wherein the first cell phone comprises a battery, and, when the battery power of the first cell phone is determined to be low, only transmissions of position query requests and responses thereto are allowed.

4. A cell phone, comprising:

a storage device storing an electronic map and a predetermined electronic schedule;

a communication unit initiating a wireless communication channel;

a processor coupled to the storage device, the communication unit, and a global positioning system (GPS) receiver, the processor retrieving current coordinates of the cell phone from the GPS receiver, and extracting map image data corresponding to the coordinates from the electronic map stored in the cell phone;

wherein the predetermined electronic schedule schedules transmissions of the map image data and the coordinates through the wireless communication channel, and the processor automatically transmits the map image data in response when receiving a position query request through the communication unit.

5. The device as claimed in claim 4, wherein the map image data comprises map images of different scales.

6. The device as claimed in claim 4, wherein the processor further transmits text data corresponding to the coordinates through the wireless communication channel.

7. The device as claimed in claim 4, wherein:

the storage device further stores a position-based condition, and transmissions of the map image data and the coordinates are initialized when the coordinates satisfy the position-based condition.

8. The device as claimed in claim 4, further comprising a battery, and, when determining that the battery power is low, only the coordinates are transmitted in response to the position query request while the map image data is not.

9. A position data exchange method, implemented in a first cell phone comprises a predetermined electronic schedule, an electronic map, and a position-based condition, each of which is stored in the first cell phone, comprising:

retrieving coordinates of the first cell phone from a global positioning system (GPS) receiver by the first cell phone;

extracting map image data corresponding to the coordinates from the electronic map by the first cell phone; and transmitting the coordinates and the map image data to a second cell phone, through a wireless communication channel when receiving a position query request from the second cell phone via the wireless communication channel, or when a current position of the first cell phone satisfies the position-based condition, or when the predetermined electronic schedule is due.

10. The method as claimed in claim 9, wherein the map image data comprises map images of different scales.

11. The method as claimed in claim 9, further comprising: transmitting text data corresponding to the coordinates through the wireless communication channel.

12. The method as claimed in claim 9, wherein the first cell phone comprises a battery, wherein the method further comprises:

determining that the battery power is low, and when the battery power is low only allowing transmissions of position query requests and responses thereto.

* * * * *